(12) United States Patent
Bogorad et al.

(10) Patent No.: US 7,774,451 B1
(45) Date of Patent: Aug. 10, 2010

(54) METHOD AND APPARATUS FOR CLASSIFYING REPUTATION OF FILES ON A COMPUTER NETWORK

(75) Inventors: Walter Bogorad, Danville, CA (US); Valery A. Kanevsky, San Lorenzo, CA (US)

(73) Assignee: Symantec Corporation, Mountain View, CA (US)

( * ) Notice: Subject to any disclaimer, the term of this patent is extended or adjusted under 35 U.S.C. 154(b) by 215 days.

(21) Appl. No.: 12/165,333

(22) Filed: Jun. 30, 2008

(51) Int. Cl.
*G06F 15/173* (2006.01)
(52) U.S. Cl. .................. 709/223; 709/203; 709/229; 726/22; 726/23; 726/24; 726/25; 713/188
(58) Field of Classification Search .......... 709/203, 709/223, 229; 726/22, 23, 24, 25; 713/188
See application file for complete search history.

(56) References Cited

U.S. PATENT DOCUMENTS

| | | | | |
|---|---|---|---|---|
| 6,088,718 | A * | 7/2000 | Altschuler et al. | 709/203 |
| 6,708,212 | B2 * | 3/2004 | Porras et al. | 709/224 |
| 6,928,474 | B2 * | 8/2005 | Venkatesan | 709/224 |
| 6,959,224 | B2 * | 10/2005 | Good et al. | 700/97 |
| 7,082,371 | B2 * | 7/2006 | Griffin et al. | 702/56 |
| 7,107,347 | B1 * | 9/2006 | Cohen | 709/229 |
| 7,295,568 | B2 * | 11/2007 | Kossi et al. | 370/432 |
| 7,426,554 | B2 * | 9/2008 | Kennedy | 709/223 |
| 7,454,754 | B2 * | 11/2008 | Tajima | 718/104 |
| 7,472,420 | B1 * | 12/2008 | Pavlyushchik | 726/24 |
| 2005/0172016 | A1 * | 8/2005 | Kossi et al. | 709/223 |
| 2007/0143460 | A1 * | 6/2007 | Ben-David et al. | 709/223 |

OTHER PUBLICATIONS

Jumppanen, Vladislav, "File reputation in decentralized P2P reputation management," HUT T-110.551 Seminar on Internetworking, Apr. 26-27, 2005.
Walsh, Kevin and Sirer, Emin Gün, "Experience with an Object Reputation System for Peer-to-Peer Filesharing," USENIX Association, NSDI '06: 3rd Symposium on Networked Systems Design & Implementation, May 8-10, 2006, San Jose, CA, pp. 1-14.

* cited by examiner

*Primary Examiner*—Michael Won
(74) *Attorney, Agent, or Firm*—Moser IP Law Group

(57) ABSTRACT

Method, apparatus, and computer readable medium for classifying a file of interest in a computer network is described. File statistics are received over the network for a plurality of users and a plurality of files. The file statistics are processed to identify: (i) a set of users that received the file of interest; (ii) a group of shared files each of which was received by at least two users; and (iii) numbers of infected files received by respective users. An average ratio of a number of infected files to a total number of files in the group of shared files is computed using a Monte Carlo process constrained by: (i) indications of which users in received which files; and (ii) the numbers of infected files received by the respective users. A probability of infection is assigned to the file of interest based on the average ratio.

20 Claims, 5 Drawing Sheets

METHOD AND APPARATUS FOR CLASSIFYING REPUTATION OF FILES ON A COMPUTER NETWORK

BACKGROUND OF THE INVENTION

1. Field of the Invention

The present invention relates generally to computer networks. More particularly, the present invention relates to a method and apparatus for classifying reputation of files on a computer network.

2. Description of the Related Art

The Internet and the World Wide Web ("web") have become commonplace, providing millions of web sites and files. Computer networks, such as the Internet, also provide some potential threats, such as computer viruses, worms, Trojans, malware, spyware, and the like. Such threats are typically in the form of a file ("infected file") received ("downloaded") through the computer network by a user's computer. Once a computer has received an infected file, the computer may become "infected", causing a decrease in performance, data loss, inoperability, or the like. To mitigate the chances of receiving an infected file, computers can be loaded with software capable of monitoring for infected files, and cleaning/quarantining infected files once detected (generally referred to herein as "antivirus software"). Antivirus software, however, can only detect known threats. Some threats try to exploit unknown, undisclosed, unpatched, etc. computer vulnerabilities and can escape detection by antivirus software (e.g., so called "zero day" threats).

Therefore, there exists a need in the art for an improved method and apparatus for classifying reputation of files on a computer network in order to reduce the probability of downloading infected files.

SUMMARY OF THE INVENTION

Method, apparatus, and computer readable medium for classifying a file of interest in a computer network is described. In some embodiments, file statistics are received over the computer network for a plurality of users and a plurality of files. The file statistics are processed to identify: (i) a set of users in the plurality of users that received the file of interest; (ii) a group of shared files in the plurality files, where each file in the group of shared files was received by at least two users in the set of users; and (iii) numbers of infected files received by respective users in the set of users. An average ratio of a number of infected files to a total number of files in the group of shared files is computed using a Monte Carlo process constrained by: (i) indications of which users in the set of users received which files in the group of shared files; and (ii) the numbers of infected files received by the respective users. A probability of infection is assigned to the file of interest based on the average ratio.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
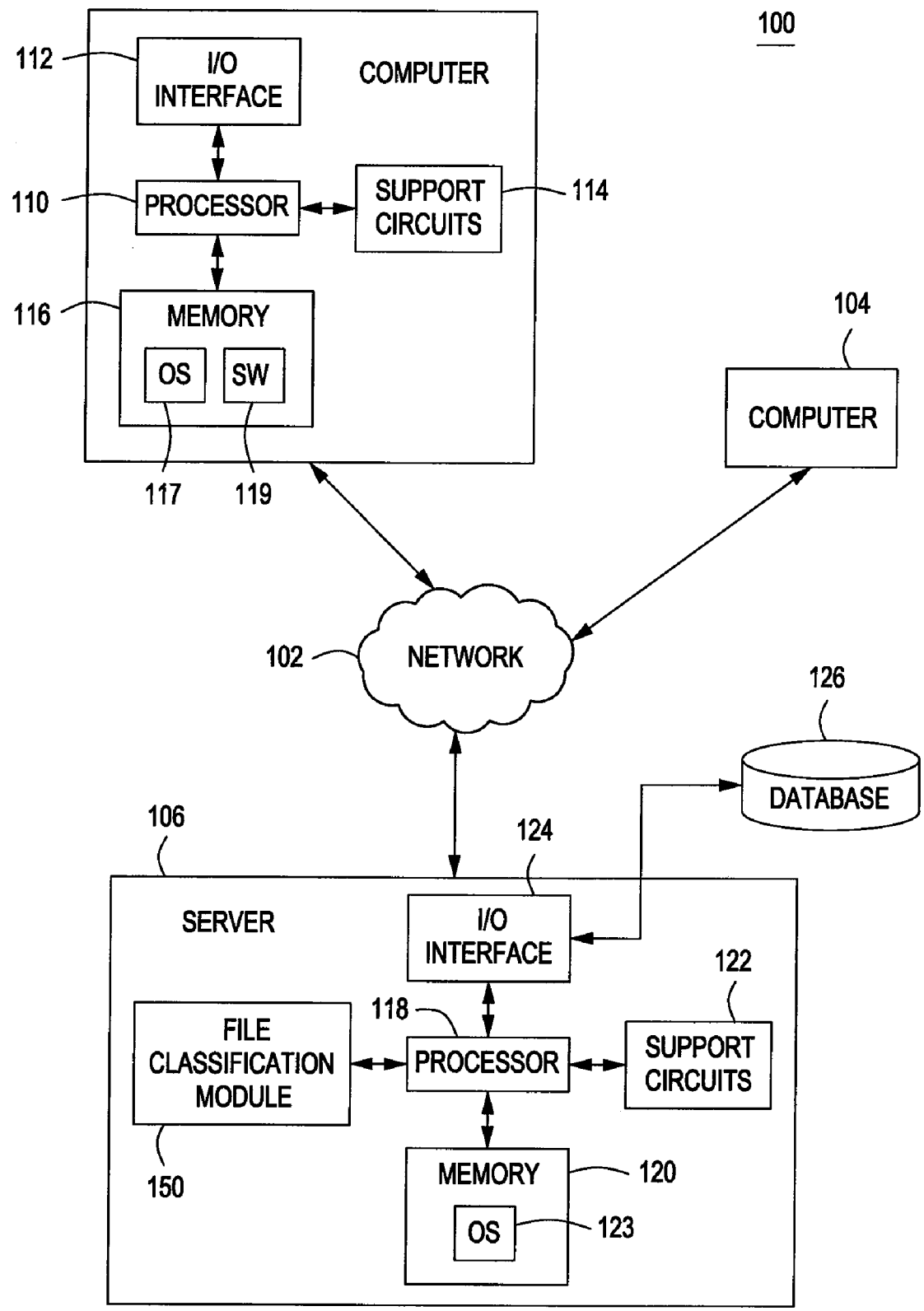
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, a plurality of computers 104 (e.g., two are shown), and a server 106. The network 102 comprises a communication system that connects computer systems by wire, cable, fiber optic, and/or wireless links facilitated by various types of well-known network elements, such as hubs, switches, routers, and the like. In particular, the network 102 connects the computers 104 and the server 106. The network 102 may employ various well-known protocols to communicate information. For example, the network 102 may employ internet protocol (IP), transmission control protocol (TCP), and the like for the transmission of packets. The network 102 may comprise part of a wide area network (WAN), such as the Internet, and/or all or part of a local area network (LAN).

Each of the computers 104 illustratively includes a processor 110, a memory 116, various support circuits 114, an I/O interface 112. For purposes of clarity, only one of the computers 104 is shown in detail in FIG. 1. The processor 110 may include one or more microprocessors known in the art. The support circuits 114 for the processor 110 include conventional cache, power supplies, clock circuits, data registers, I/O interfaces, and the like. The I/O interface 112 may be directly coupled to the memory 116 or coupled through the processor 110. The I/O interface 112 may also be configured for communication with input devices and/or output devices, such as, network devices, various storage devices, mouse, keyboard, display, and the like (not shown). The I/O interface 112 is also coupled to the network 102.

The memory 114 may include one or more of the following random access memory, read only memory, magneto-resistive read/write memory, optical read/write memory, cache memory, magnetic read/write memory, and the like. Each of the computers 104 may be configured with an operating system (OS) 117, which may include OS/2, Java Virtual Machine, Linux, Solaris, Unix, HPUX, AIX, Windows, Windows Server, among other known platforms. At least a portion of the OS 117 may be disposed in the memory 117. Each of the computers 104 may also be configured with software 119 configured to monitor downloading of files from the network 102 (e.g., antivirus software or the like). The software 119 is configured to record identifying information for each downloaded file over time (e.g., filename, location on the network 102, uniform resource locator (URL), etc.). The term "file" is meant to encompass various types of files transferred between the network 102 and the computers 104, including data files, executable files, application files, web page files (e.g., hypertext markup language files), and the like. In particular, identifying information for a file can be a web address, which corresponds to the default file that is downloaded when the web site is accessed (e.g., www.symantec.com/index.html). The software 119 is also configured to scan for infections (e.g., viruses, Trojans, worms, malware, and the like) and records the number of infections detected over time.

The server 106 illustratively includes a processor 118, a memory 120, various support circuits 122, an I/O interface 124. The processor 118 may include one or more microprocessors known in the art. The support circuits 122 for the processor 118 include conventional cache, power supplies, clock circuits, data registers, I/O interfaces, and the like. The I/O interface 124 may be directly coupled to the memory 120 or coupled through the processor 118. The I/O interface 124 is also coupled to the network 102. The I/O interface 124 may be further coupled to a database 126. The database 126 may be implemented using one or more computers, storage devices, and/or the like. Alternatively, the database 126 may be implemented using the memory 120 of the server 106.

The memory 120 may include one or more of the following random access memory, read only memory, magneto-resistive read/write memory, optical read/write memory, cache memory, magnetic read/write memory, and the like, as well as signal-bearing media as described below. The server 106 may be configured with an operating system 123, which may include Linux, Solaris, Unix, HPUX, AIX, Windows Server, among other known platforms. At least a portion of the OS 123 may be disposed in the memory 120.

The server 106 is further configured with a file classification module 150. The file classification module 150 is configured to obtain submissions from the software 119 in each of the computers 104. A "submission" may include a list of downloaded files for a particular user and a number of infected files detected during a particular time period. For example, a submission may indicate that during a particular day, user 1 downloaded files "foo", "bar", "abc", and "xyz", and had one infected file detected. The file classification module 150 may prompt the software 119 for submissions, or the software 119 may send submissions on its own. The file classification module 150 may store the information associated with the submissions in the database 126 ("file statistics"). Thus, the database 150 may store file statistics comprising lists of files downloaded by users over particular time periods, as well as numbers of infected files detected for the users over the particular time periods. The file classification module 150 is configured to select files of interest and classify them according to a probability of infection. In this manner, a plurality of the files downloaded by the users may be analyzed and assigned a probability of infection. Probabilities of infection may be sent from the server 106 to the software 119 in the computers 104 to facilitate protection from infection.

Figure 2:
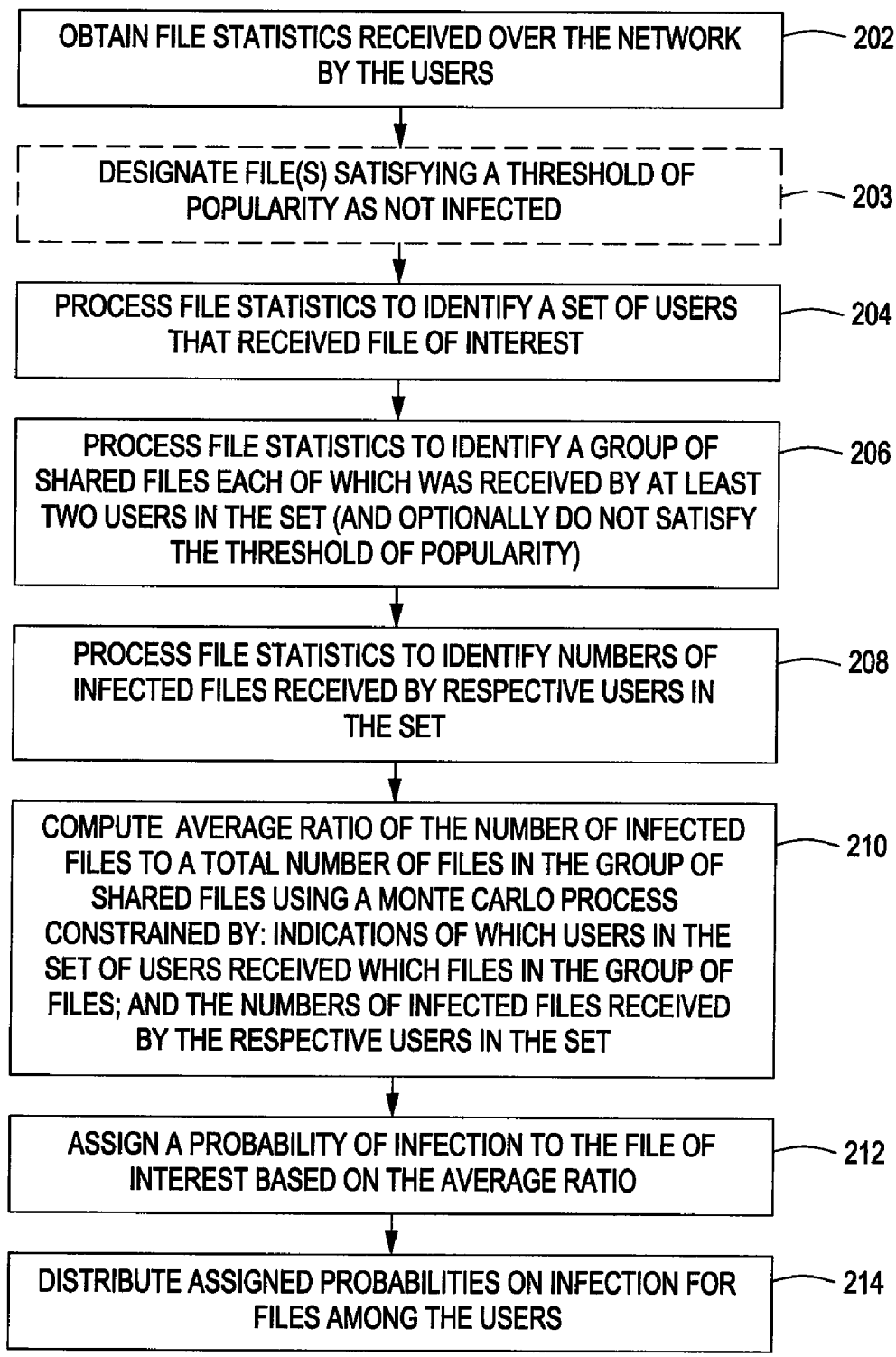
FIG. 2 is a flow diagram depicting an exemplary embodiment of a method for classifying reputation of a file of interest in accordance with one or more aspects of the invention.

FIG. 2 is a flow diagram depicting an exemplary embodiment of a method 200 for classifying a file of interest in accordance with one or more aspects of the invention. The method 200 may be performed by the file classification module 150 in the server 106 described above. The method 200 begins at step 202, where the server 106 obtains file statistics received over the computer network 102 from the computers 104. The file statistics can be obtained from the database 126 and can be associated with a plurality of users and a plurality of files. The file statistics may include, for each of the users, a list of files received by the user and a number of infected files received by the user. For each user, the list of received files and the number of received infected files may be divided among multiple time periods or submissions, as described above.

At step 204, the server 106 processes the file statistics to identify a set of the users that received the file of interest. At step 206, the server 106 processes the file statistics to identify a group of shared files, where each file therein was received by at least two of the users in the identified set of users. Note that the group of shared files necessarily includes the file of interest, since the file of interest is shared by all of the users in the set. In addition, if the file statistics are divided into submissions, then for each user in the set, only the submission that includes the file of interest may be analyzed to identify shared files. At step 208, the server 106 processes the file statistics to identify numbers of infected files received by respective users in the identified set of users. Note that the file statistics only include a number of infected files for each user, not which of the files are infected. In addition, if the file statistics are divided into submissions, then for each user in the set, only the submission that includes the file of interest may be analyzed to identify a number of infected files.

At step 210, the server 106 computes an average ratio of the number of infected files to a total number of files in the group of shared files using a Monte Carlo process constrained by: indications of which users in the set of users received which files in the group of shared files; and the numbers of infected files received by the respective users in the set of users. The Monte Carlo process is carried out for a plurality of simulations, where for each simulation a ratio of the number of infected files to the total number of files in the group of shared files is computed according to the above-described constraints. The ratios computed over the simulations are averaged to produce the average ratio. An exemplary embodiment of this process is described below.

At step 212, the server 106 assigns a probability of infection to the file of interest based on the average ratio computed in step 214. For example, if there are 10 files in the shared group, and it is determined in step 214 that on average there are 4 infected files in the group, then each file in the group, including the infected file, may be considered to have a 40% probability of infection. Note that the probability of infection is actually determined for the file of interest, as well as the remaining files in the group of shared files. Thus, it is not necessary to repeat the method 200 for the remaining files in the group of shared files. The method 200 can be repeated for other files identified in the file statistics.

At step 214, the server 106 may distribute assigned probabilities of infection for files among the users by transmission over the network 102 to the computers 104. The method 200 may be repeated for other files identified in the file statistics. The software 119 in the computers 104 may use received probabilities of infections as a safety mechanism while downloading files from the network 102. For example, the software 119 may establish one or more threshold probabilities. When a file is downloaded, the software 119 may determine if the file has an assigned probability of infection. If so, the software 119 can compare the assigned probability of infection with the threshold(s) and take one or more actions if the assigned probability exceeds one or more of the thresholds. Actions may include, for example, displaying an alert or otherwise notifying the user, preventing download of the file, downloading the file into quarantine, and the like. Those skilled in the art will appreciate that the probabilities of infection for files can be used in other ways to reduce the chances of downloading an infected file.

An exemplary embodiment of a process for computing a probability of infection for a file of interest may be understood with respect to the following model of the problem. The model follows the Maximum Entropy Principle, i.e. for features lacking information, assume that the values thereof are uniformly distributed over the appropriate domain. Further, the model assumes the following:

1. If a file is clean for at least one user, the file must be clean for all users.
2. If a file is infected for at least one user, the file must be infected for all users
3. A file of interest X defines a set of users who downloaded the file.
4. Information about a user can include a series of submissions. Each submission includes newly received files and a total number of infections. This imposes an additional uncertainty on composition of user file sets, i.e. it is not known if a particular file is clean or infected; only corresponding cardinalities are available. Assume 1-to-1 correspondence between files and infections. If it is known that multiple infections are associated with a particular file, the multiple files can be grouped and presented as a single threat.
5. A probability of file X to be infected is computed as a ratio of the number of infected files over a total number of files from the above intersection, i.e. a probability of infection is estimated for each shared file simultaneously.

The universe U={A} of downloads is considered known up to the level of names of individual files and users who downloaded them, whereas only total numbers of infected files for every user are available.

Figure 3:
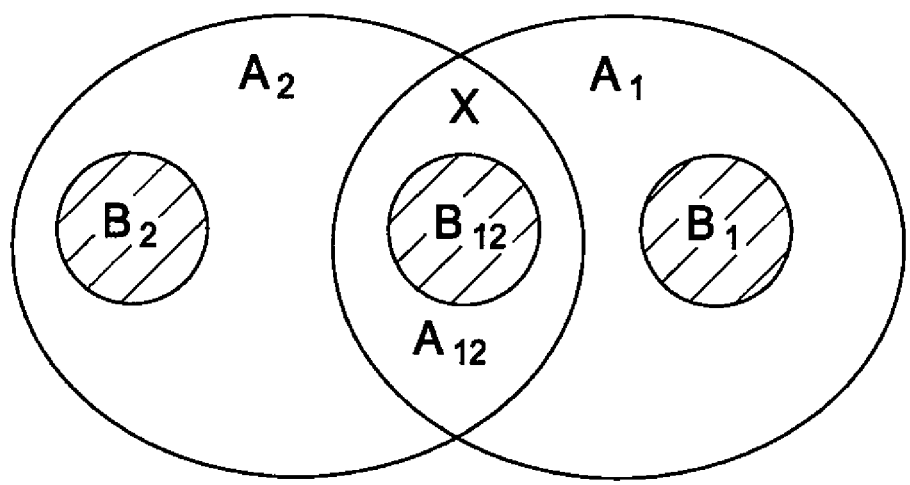
FIG. 3 is a Venn diagram depicting an exemplary universe of downloads for a plurality of users.

FIG. 3 is a Venn diagram 300 depicting an exemplary universe of downloads for a plurality of users. For purposes of clarity by example, the Venn diagram 300 includes information for two particular users, user 1 and user 2. Those skilled in the art will appreciate that the example can be generally extended for a plurality of users. Let $A_1, A_2, \ldots, A_k$ be all relevant sets of downloaded files containing file X. Let $B_1, B_2, \ldots, B_k$ be subsets of $A_1, A_2, \ldots, A_k$ and include infected files, respectively. In the model, $\{B_i\}$ are selected so that the assumptions described above satisfied. According to the model, the probability of X to be infected is modeled by a random choice of a file from:

$$A = \bigcap_1^k A_i;$$

and registering whether or not it falls into the set:

$$B = A \cap \left(\bigcap_1^k B_i\right).$$

Those skilled in the art will understand that, according to the Venn diagram 300 and the above analysis, the probability that file of interest X is infected (bad) is:

$$p = P(X = \text{Bad}) = \frac{|B|}{|A|}. \quad (1)$$

Implicitly, set A accounts for user browsing behaviors, since set A is defined as a set of files common for all users that downloaded the file of interest. To evaluate the probability in equation (1), the number of bad files in B needs to be assigned. This number is not immediately available from the measurements. It is only known that the number of infected files in B cannot exceed total number of shared files and is random. (The randomness follows from Assumption 4 above. If it were not random, it could just be measured and the problem would not exist). As such, a distribution of the number of infected files in B can be derived.

Referring to FIG. 3, consider the case of two users and assume the following:

k is number of shared infected files;

$n_1$ is number of infected files for user 1;

$n_2$ is number of infected files for user 2;

$N_1$ is the number of files received by user 1;

$N_2$ is the number of files received by user 2; and $N_3$ is the number of shared files between user 1 and user 2.

Then, the following equations hold:

$|A_1| = N_1 + N_3;$ $|A_2| = N_2 + N_3;$ $|A_{12}| = N_3;$ $|B_{12}| = k;$ $|B_1| = n_1 - k;$ and $|B_2| = n_2 - k.$ Consider the number of combinations by which infected files can be selected from subsets of $A_1 - A_{12}$, $A_{12}$, and $A_2 - A_{12}$. The probability P(k) to have k bad files in the intersection is:

$$P(k) = \frac{\binom{N_1}{n_1-k}\binom{N_3}{k}\binom{N_2}{n_2-k}}{\sum_{i=0}^{\min(n_1, n_2, N_3)} \binom{N_1}{n_1-i}\binom{N_3}{i}\binom{N_2}{n_2-i}}. \quad (2)$$

It is clear that the values of:

$k \in [0, \min(n_1, n_2, N_3)].$

From equation (1), it follows that:

$$p = \frac{\sum_{k=0}^{\min(n_1, n_2, N_3)} P(k) * k}{N_3}. \quad (3)$$

It is interesting to note that users having more downloads contribute more into equation (3) than users having fewer downloads.

In the general case of M users, equation (2) becomes the following:

$$P(k) = \frac{\prod_i \binom{N_i}{n_i - k} \prod_{i>j} \binom{N_{ij}}{n_{ij} - k} \prod_{i>j>k} \binom{N_{ijk}}{n_{ijk} - k} \cdots \binom{N_{1,2\ldots M}}{k}}{\sum_{k=0}^{\min(n_1, n_2, N_3 \cdots, n_1 \cdots M, N_1 \cdots M)} \prod_i \binom{N_i}{n_i - k} \prod_{i>j} \binom{N_{ijk}}{n_{ij} - k} \prod_{i>j>k} \binom{N_{ijk}}{n_{ijk} - k} \cdots \binom{N_{1,2\ldots M}}{k}}, \quad (4)$$

where $N_{ijk}$ is a total number of shared files and $n_{ijk}$ is a number of infected shared files for just users i, j, k. Equation (4) becomes computationally intractable for large number of users, since the number of factors and summands grow exponentially with M. Thus, a Monte Carlo process can be used to estimate the probability.

Again, assuming the case of two users 1 and 2, the constraints on the number of infected files in each region can be expressed as:

Number of infected files for user 1 shall be equal to $n_1$, i.e.

$$|B_1| + |B_{12}| = n_1$$

Number of infected files for user 2 shall be equal to $n_2$, i.e.

$$|B_2| + |B_{12}| = n_2$$

Total number of shared bad files cannot exceed total number of shared files, i.e.

$$|B_{12}| \leq N_3$$

In the general case of M users, the constraints are as follows:

$$\sum_j |B_{i,j}| + \sum_{j,k} |B_{i,j,k}| + \ldots + \sum_{j,k,\ldots M} |B_{i,j,k,\ldots,M}| = n_i, \quad (5)$$

where $i = 1 \ldots M$ $$|B_{i,j}| \leq N_{ij}$$

$$|B_{i,j,k}| \leq N_{ijk}$$

$$\ldots$$

$$|B_{i,j,k\ldots M}| \leq N_{i,j,k\ldots M};$$

and where $N_{i,j,k\ldots M}$ is number of shared files among M users (equation 6).

To represent the measurement data, an incident matrix I can be defined with dimensions M×N, where rows correspond to files and columns correspond to users. The matrix cells can include two possible values, '0' or '1'. A '1' in matrix cell (i, j) represents that user i downloaded file j. A '0' in matrix cell (i, j) represents that user i did not download file j. The constraints of equations (5) and (6) can be represented by the following matrix equation:

$$I * L = n \quad (7)$$

where I is the incident matrix, as described above. L is a matrix of file allocations having dimension 1×N. The elements of L are:

$$l_i \in (0,1),$$

where '0' represents that the file in position i is clean, and '1' represents that the file in position i is infected. n is a matrix of numbers of infected files received by users having dimension 1×M, where its element $n_i$ is a number of infected files received by user i. The constraints of equation (5) are automatically satisfied in equation (7) due to the nature of the incident matrix. Furthermore, equation (7) has a non-deterministic solution only if N>M.

From the Maximum Entropy Principle, all allocations of good and bad files (not infected and infected) that satisfy constraints (5) and (6) are considered equally likely. Given a particular allocation, the probability for a file to be infected can be calculated according to equation (1). The expected value of the ratio in equation (1) can be treated over all possible allocations as the probability for file X to be infected, i.e.

$$p = \sum_{k=0}^{|A|} \frac{k}{|A|} P(|B| = k). \quad (8)$$

In terms of Monte Carlo Method, an estimate of p can be presented in the following form:

$$p^* = \frac{1}{n} \sum_{i=1}^{n} \frac{k_i}{|A|}, \quad (9)$$

where $k_i$ is the number of infected files in the i-th simulation and n is the total number of simulations. It is known that p* converges in distribution and almost certainly to p.

A calculation according to equation (9) can be performed in the step 210 of the method 200 in FIG. 2. That is, an average ratio of the number of infected files to the total number of shared files is computed using a Monte Carlo process constrained by indications of which users downloaded which files (as represented by the incident matrix) and numbers of infected files received by respective users (as represented by the matrix n).

Figure 4:
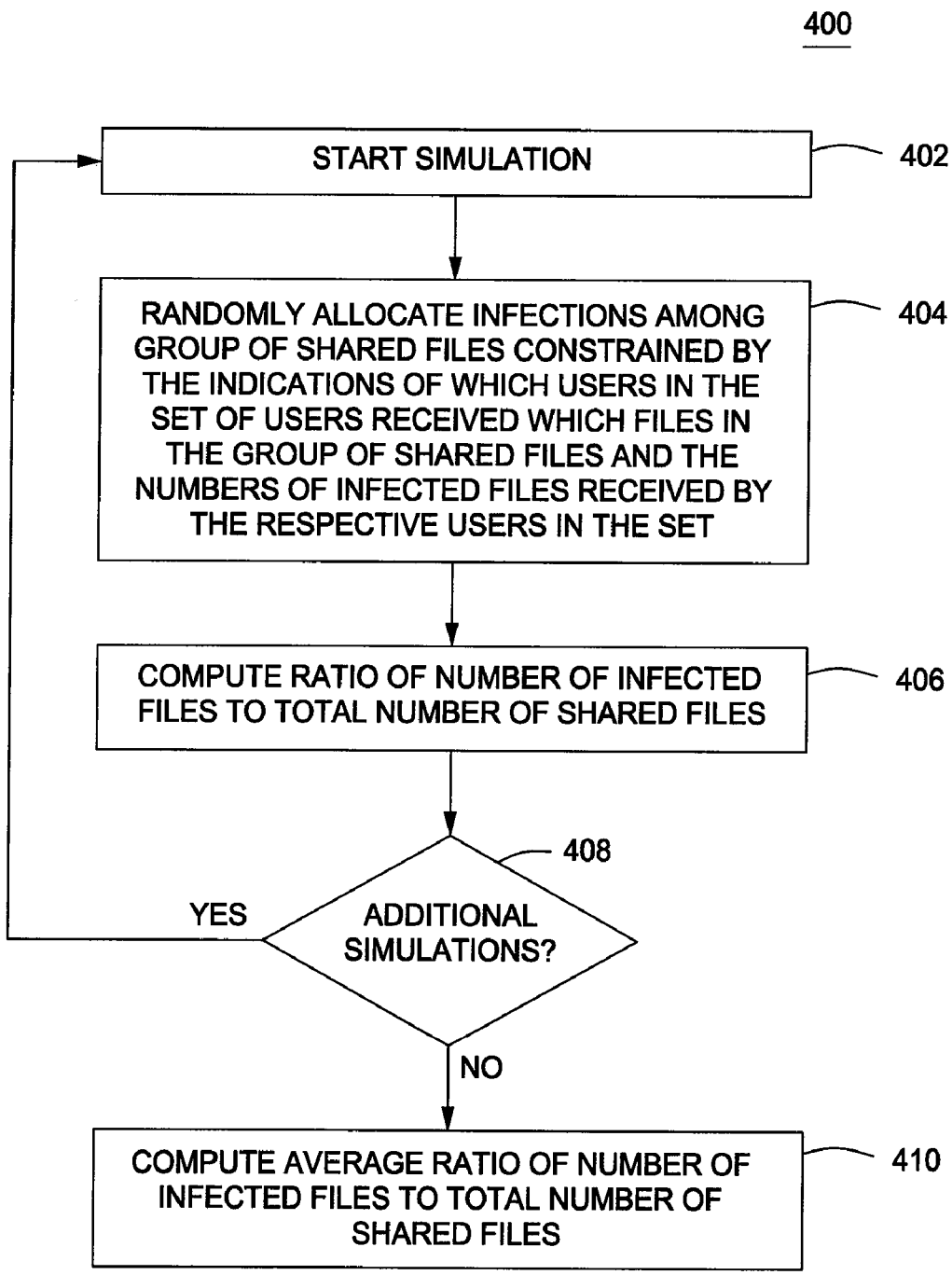
FIG. 4 is a flow diagram depicting an exemplary embodiment of a method for computing the average ratio of the number of infected files to the total number of shared files using a Monte Carlo process in accordance with one or more aspects of the invention.

FIG. 4 is a flow diagram depicting an exemplary embodiment of a method 400 for computing the average ratio of the number of infected files to the total number of shared files using a Monte Carlo process in accordance with one or more aspects of the invention. The method 400 may be performed in step 210 of the method 200 in FIG. 2. The method 400 begins at step 402, where a simulation is started. At step 404, infections are randomly allocated among the group of shared files constrained by the indications of which users in the set of users received which files in the group of shared files, and the numbers of infected files received by the respective users. At step 406, a ratio of the number of infected files to a total number of files in the group of shared files is computed. At step 408, a determination is made whether additional simulations are to be performed. If so, the method 400 returns to step 402, where another simulation is started. Otherwise, the method 400 proceeds to step 410. At step 410, the ratios computed at step 406 for all simulations are averages to produce the average ratio of the number of infected files to the total number of shared files.

Figure 5:
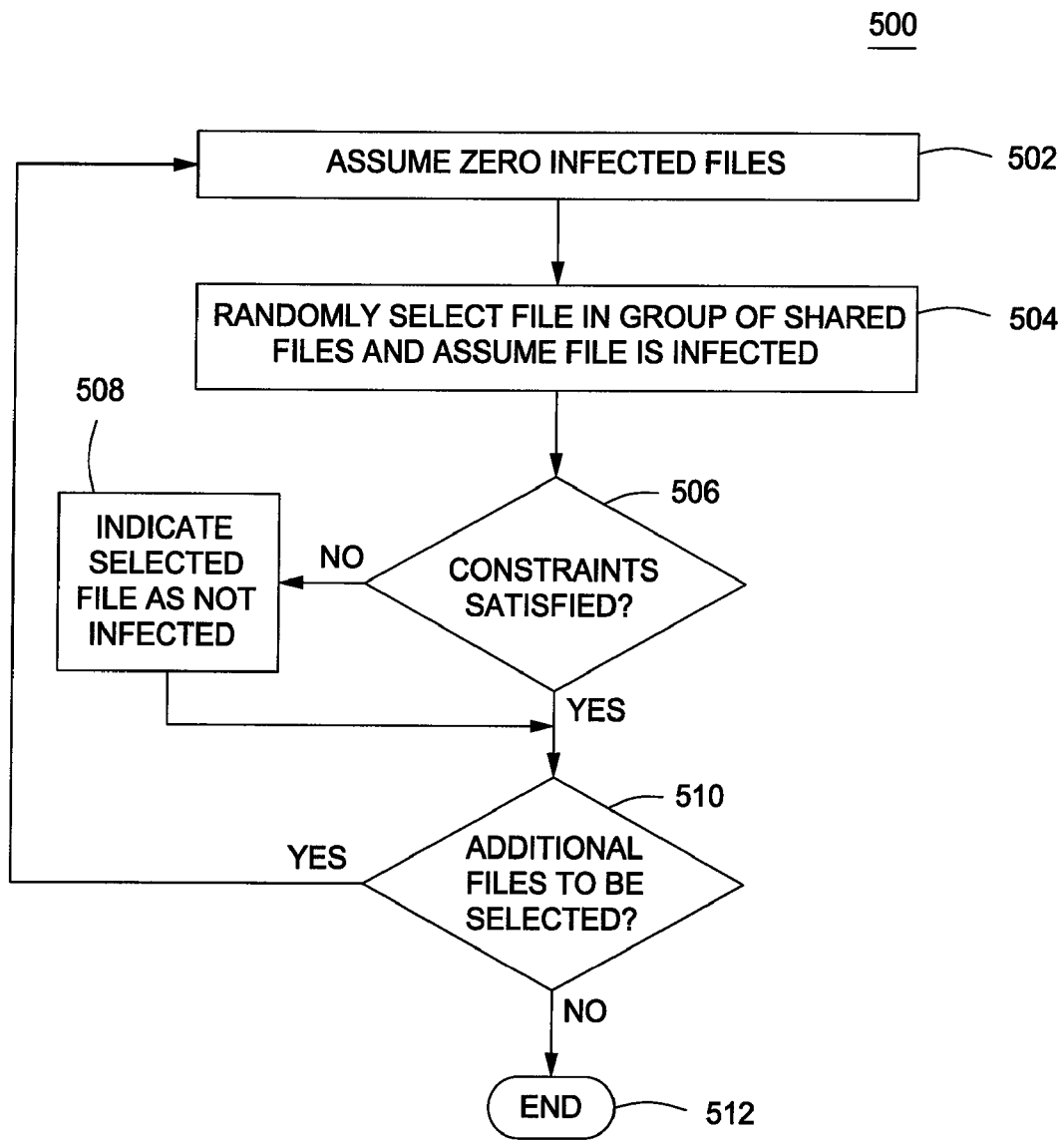
FIG. 5 is a flow diagram depicting an exemplary embodiment of a method for randomly allocating infections among the shared files in accordance with one or more aspects of the invention.

FIG. 5 is a flow diagram depicting an exemplary embodiment of a method 500 for randomly allocating infections among the shared files in accordance with one or more aspects of the invention. The method 500 may be performed at step 404 in the method 400 of FIG. 4. Given the file statistics described above, the incident matrix I and the matrix n are known. At the beginning of each simulation, the matrix L is unknown. The method 500 begins at step 502, where zero infected files are assumed. That is, all elements in L are initially zero. At step 504, a file in the group of files is randomly selected and assumed to be infected. That is, an element of the matrix L is selected at random and assigned a value of '1'. At step 506, a determination is made whether the equation I*L=n can be satisfied (equation 7). That is, whether the constraints of which users downloaded which files and the numbers of infected files for the respective users can be satisfied given the present allocation of infected files. If not, the method 500 proceeds to step 508, where the file selected at step 504 is indicated as being not infected. That is, the selected element of matrix L is set back to '0'. If equation (7) can be satisfied with the present allocation of infected files, then the method 500 proceeds to step 510. At step 510, a determination is made whether there are additional files in the group of files that have not be selected at step 504. If so, the method 500 returns to step 504, where another file is randomly selected. Otherwise, the method 500 ends at step 512.

Once the method 500 is executed to completion, the number of '1's in the matrix L represents the number of infected files in the shared group of files for this particular simulation of the method 400. Thus, the ratio of the number of infected files to the total number of shared files can be computed and the next simulation performed. The computational complexity of the algorithm of the methods 400 and 500 is $O(M_C N_C)$, where $N_C$ is the number of shared files and $M_C$ is the number of users who downloaded those files. In general, assuming the typical number of files in a submission by a user is on the order of tens, then the number of shared files $N_C$ is expected to be relatively small, i.e., on the order of tens. Therefore, the values of probabilities on the order of tens can be estimated to observe k shared bad files. Furthermore, as follows from assumption 5 above, the methods described above provide a probability of infection for not just the file of interest, but for all shared files and thus the actual computational complexity of the algorithm is $O(M_C)$.

After proper normalization, p* in equation (9) converges towards the standard normal distribution N(0,1) as n approaches infinity due to the Central Limit Theorem. Therefore, the confidence interval for p can be written as the following:

$$|p - p^*| \leq \frac{z_{\alpha/2} \sigma}{\sqrt{n}}.$$

Because p* cannot exceed 1, then $\sigma \leq 1$ and:

$$|p - p^*| \leq \frac{z_{\alpha/2}}{\sqrt{n}}. \quad (10)$$

If |p−p*| is not to exceed some number ε, then $$n \leq z_a^2/2/\epsilon^2.$$

For a confidence level of 95%, $$(z_{\alpha/2}=1.96),$$

$$\epsilon=0.1p, \text{ and}$$

$$n = \frac{1.96^2 * 100}{p^2} \approx \frac{400}{p^2}.$$

Returning to FIG. 2, in some embodiments, the method 200 may include an optional step 203, where the file statistics are processed to determine a file popularity threshold and any of the files that satisfy the popularity threshold are designated as not infected. If a file is popular, then the file is likely not infected because chances are high that there has been at least one user who had reported no infections during a submission having the file. Thus, a threshold of popularity can be established. If such a popularity threshold is established, then the group of shared files can be files that do not satisfy the popularity threshold. Since any file that satisfies the threshold is assumed clean, such file can be omitted from the group of shared files across which infected files will be allocated.

In the embodiments described above, a memory may store processor-executable instructions and/or data that may be executed by and/or used by a processor. These processor-executable instructions may comprise hardware, firmware, software, and the like, or some combination thereof. Modules having processor-executable instructions that are stored in a memory may include backup services, user interfaces, and the like. In other embodiments, all or a portion of each of these modules may be implemented in hardware, software, or a combination of hardware and software, including implementations using programmable logic devices (PLDs), application specific integrated circuits (ASICs), and the like. Thus, the term "module" as used herein encompasses software implementations, hardware implementations, or a combination of software and hardware implementations.

Aspects of the methods described above may be implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of classifying a file of interest in a computer network, comprising:
   receiving, over the computer network, file statistics for a plurality of users and a plurality of files;
   processing the file statistics to identify: (i) a set of users in the plurality of users that received the file of interest; (ii) a group of shared files in the plurality files, where each file in the group of shared files was received by at least two users in the set of users; and (iii) numbers of infected files received by respective users in the set of users;
   computing an average ratio of a number of infected files to a total number of files in the group of shared files using a Monte Carlo process constrained by: (i) indications of which users in the set of users received which files in the group of shared files; and (ii) the numbers of infected files received by the respective users; and
   assigning a probability of infection to the file of interest based on the average ratio.

2. The method of claim 1, further comprising:
   distributing the probability of infection among the plurality of users over the computer network.

3. The method of claim 1, wherein the step of computing comprises:
   (a) randomly allocating infections among the group of shared files in a simulation, the simulation constrained by: (i) the indications of which users in the set of users received which files in the group of shared files; and (ii) the numbers of infected files received by the respective users;
   (b) computing a ratio of a number of infected files to a total number of files in the group of shared files in the simulation; and
   (c) repeating steps (a) and (b) for a plurality of simulations to compute the average ratio.

4. The method of claim 3, wherein the step of processing comprises:
   forming an incident matrix, I, representing the indications of which users in the set of users received which files in the group of shared files;
   forming a matrix, n, representing the numbers of infected files received by the respective users.

5. The method of claim 4, wherein the step of randomly allocating comprises:
   (a1) forming a matrix, L, representing indications of which files in the group of shared files are infected, where the matrix L initially represents that all of the files in the group of shared files are not infected;
   (a2) randomly selecting a file in the group of shared files and indicating such file as infected in the matrix L;
   (a3) if an equation $I*L=n$ cannot be satisfied, indicating the file as selected in step (a2) as not infected; and
   (a4) repeating steps (a2) and (a3) for each remaining file in the group of shared files.

6. The method of claim 1, wherein the file statistics include, for each user of the plurality of users, a list of files, of the plurality of files, received by the user and a number of infected files received by the user.

7. The method of claim 1, further comprising:
   processing the file statistics to determine a file popularity threshold, where any of the plurality of files satisfying the popularity threshold are designated as not infected;
   wherein each file in the group of shared files has a popularity that does not satisfy the file popularity threshold.

8. Apparatus for classifying a file of interest in a computer network, comprising:
   means for receiving, over the computer network, file statistics for a plurality of users and a plurality of files;
   means for processing the file statistics to identify: (i) a set of users in the plurality of users that received the file of interest; (ii) a group of shared files in the plurality files, where each file in the group of shared files was received by at least two users in the set of users; and (iii) numbers of infected files received by respective users in the set of users;
   means for computing an average ratio of a number of infected files to a total number of files in the group of shared files using a Monte Carlo process constrained by: (i) indications of which users in the set of users received which files in the group of shared files; and (ii) the numbers of infected files received by the respective users; and
   means for assigning a probability of infection to the file of interest based on the average ratio.

9. The apparatus of claim 8, further comprising:
   means for distributing the probability of infection among the plurality of users over the computer network.

10. The apparatus of claim 8, wherein the means for computing comprises:
    means for randomly allocating infections among the group of shared files in a simulation, the simulation constrained by: (i) the indications of which users in the set of users received which files in the group of shared files; and (ii) the numbers of infected files received by the respective users;
    means for computing a ratio of a number of infected files to a total number of files in the group of shared files in the simulation; and
    means for repeating the random allocation of infections and the computer of the ratio for a plurality of simulations to compute the average ratio.

11. The apparatus of claim 10, wherein the means for processing comprises:
    means for forming an incident matrix, I, representing the indications of which users in the set of users received which files in the group of shared files;
    means for forming a matrix, n, representing the numbers of infected files received by the respective users.

12. The apparatus of claim 8, wherein the file statistics include, for each user of the plurality of users, a list of files, of the plurality of files, received by the user and a number of infected files received by the user.

13. The apparatus of claim 8, further comprising:
    means for processing the file statistics to determine a file popularity threshold, where any of the plurality of files satisfying the popularity threshold are designated as not infected;
    wherein each file in the group of shared files has a popularity that does not satisfy the file popularity threshold.

14. A computer readable medium having stored thereon instructions that, when executed by a processor, cause the processor to perform a method of classifying a file of interest in a computer network, comprising:
    receiving, over the computer network, file statistics for a plurality of users and a plurality of files;
    processing the file statistics to identify: (i) a set of users in the plurality of users that received the file of interest; (ii) a group of shared files in the plurality files, where each file in the group of shared files was received by at least two users in the set of users; and (iii) numbers of infected files received by respective users in the set of users;

computing an average ratio of a number of infected files to a total number of files in the group of shared files using a Monte Carlo process constrained by: (i) indications of which users in the set of users received which files in the group of shared files; and (ii) the numbers of infected files received by the respective users; and assigning a probability of infection to the file of interest based on the average ratio.

15. The computer readable medium of claim 14, further comprising:

distributing the probability of infection among the plurality of users over the computer network.

16. The computer readable medium of claim 14, wherein the step of computing comprises:

(a) randomly allocating infections among the group of shared files in a simulation, the simulation constrained by: (i) the indications of which users in the set of users received which files in the group of shared files; and (ii) the numbers of infected files received by the respective users;

(b) computing a ratio of a number of infected files to a total number of files in the group of shared files in the simulation; and (c) repeating steps (a) and (b) for a plurality of simulations to compute the average ratio.

17. The computer readable medium of claim 16, wherein the step of processing comprises:

forming an incident matrix, I, representing the indications of which users in the set of users received which files in the group of shared files;

forming a matrix, n, representing the numbers of infected files received by the respective users.

18. The computer readable medium of claim 17, wherein the step of randomly allocating comprises:

(a1) forming a matrix, L, representing indications of which files in the group of shared files are infected, where the matrix L initially represents that all of the files in the group of shared files are not infected;

(a2) randomly selecting a file in the group of shared files and indicating such file as infected in the matrix L;

(a3) if an equation I*L=n cannot be satisfied, indicating the file as selected in step (a2) as not infected; and (a4) repeating steps (a2) and (a3) for each remaining file in the group of shared files.

19. The computer readable medium of claim 14, wherein the file statistics include, for each user of the plurality of users, a list of files, of the plurality of files, received by the user and a number of infected files received by the user.

20. The computer readable medium of claim 14, further comprising:

processing the file statistics to determine a file popularity threshold, where any of the plurality of files satisfying the popularity threshold are designated as not infected;

wherein each file in the group of shared files has a popularity that does not satisfy the file popularity threshold.

* * * * *